Oct. 3, 1950  T. O. MARTIN  2,524,324
BAIT HOLDER ATTACHMENT FOR ANIMAL TRAPS
Filed Jan. 16, 1946
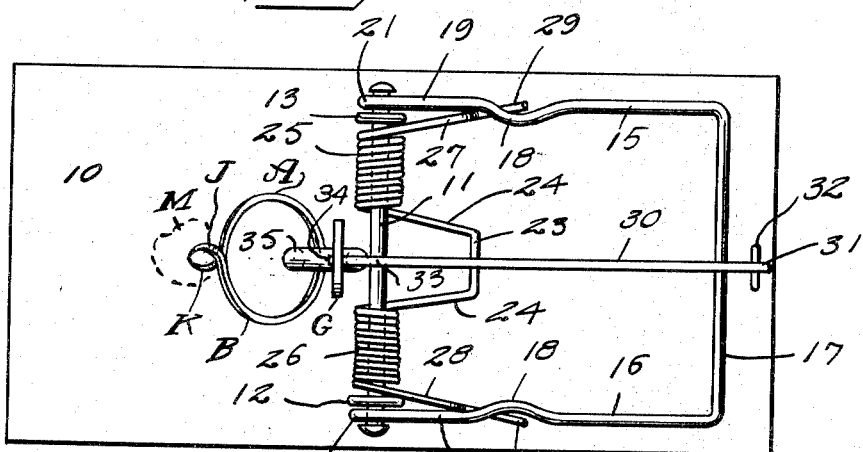
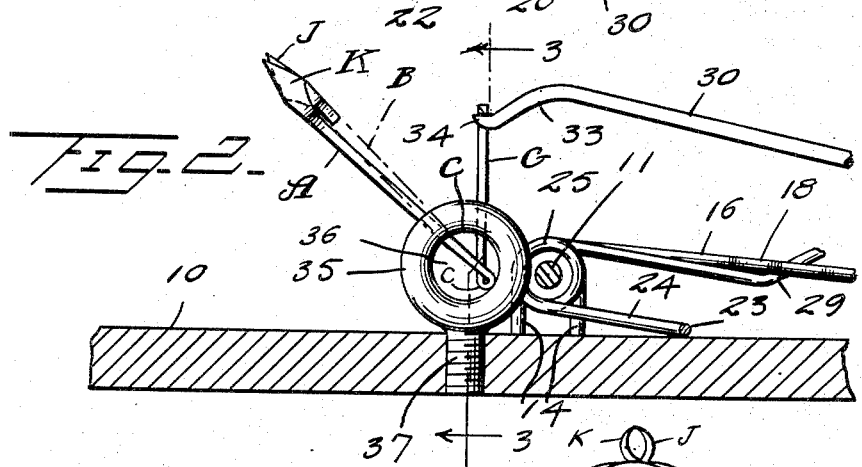
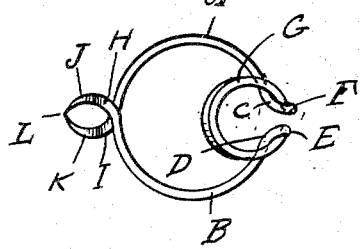
Inventor
T. O. Martin
By
Kimmel & Crowell Attorneys Patented Oct. 3, 1950

2,524,324

UNITED STATES PATENT OFFICE 2,524,324

BAIT HOLDER ATTACHMENT FOR ANIMAL TRAPS

Trevellic O. Martin, Jackson, Tenn.

Application January 16, 1946, Serial No. 641,498

3 Claims. (Cl. 43—77)

This invention relates to improvements in traps and more particularly to bait holding means therefor.

One object thereof is to so construct, shape and arrange the novel bait holder upon an animal trap so that it will not be necessary in the assembly thereof to change any part of the construction of the trap with which it is associated, the same parts being used so far as is concerned with setting the trap using spring action for imprisoning the animal thereon.

Another object thereof is to provide an animal trap with novel bait holding means which dispenses with the necessity of tying the bait on to the securing parts and supplies a more easily mounted and set bait holder.

Another object thereof is to provide, in a device of the character described a bait holding clamp having a universal connection with relation to the operative movable parts of the trap to thereby adapt it to swing laterally, up or down, or back and forth so as to be equally well effective in releasing the tripping bar of the trap no matter from what angle the bait is pulled by the rodent.

A further object thereof is to provide a bait holding means for traps and the like characterized by the fact that it admits of supporting the bait holder more conveniently for operating purposes upon the base with due regard to elimination of any binding strain, undue friction, or derangement of the parts thereof since such means consists of a single length of resilient wire.

With the above and other objects in view my invention consists in the combination, arrangement and details of construction disclosed in the drawings and specification, and then more particularly pointed out in the appended claims.

In the drawings, wherein similar reference characters designate similar parts throughout the several views, Figure 1 is a top plan view of a trap equipped with my bait holding and support means, Figure 2 is a side elevation of the parts of Figure 1, some parts being in section, and others broken away, Figure 3 is an exaggerated view of the bait clamping part of my invention, and Figure 4 is a top plan view of the bait holder proper.

Referring to the drawings, which are merely descriptive of my invention, there is disclosed a trap of conventional form and construction. The present bait holding appendage is intended to be used in connection with any style, type or shape of animal traps using exposed bait. For illustrative purposes one form of trap has a base 10 disclosed, upon which the working parts of the mechanism are operatively mounted. This consists of two bearings being oppositely arranged transversely of and at the center of the base 10, of any approved design for the purpose of journaling therein at opposite ends a pintle 11, the staples being preferably used, driven into the base at a sufficient distance to space their upper loops away from the top of the base. These oppositely arranged loops are designated 12 and 13 respectively, while their prongs are designated 14.

Oppositely arranged arms 15 and 16 of a gripping device are shown formed upon an integral cross rod 17. The arms 15 and 16 are formed between their ends with crinkles 18 and at their inner ends 19 and 20 are formed into eyes 21 and 22, linked onto the pintle 11 at its outermost ends. As a means of setting the gripping device, a spring tension imparting means is provided consisting of oppositely arranged and forwardly converging arms 24 joined by a cross rod 23, and oppositely arranged spring coils 25 and 26 are mounted upon the pintle 11 and terminate in fingers 27 and 28, respectively, which diverge forwardly from their points of juncture with the spring coils and are pressed by said coils into engagement terminally with the crinkles 18 of the arms of the gripping device. It will be observed that offset ends 29 and 30 are formed upon these fingers for frictional engagement with said crinkles of the gripping arms. The cross rod 23 of the spring means bears down upon the base, and a tripping bar 30 of rigid construction has its outer end operatively looped as at 31 to the attaching member 32, while its other and free end is engaged with the bait holder now to be described. The tripping bar 30 bears down overlappingly upon the cross rod 17 of the gripping device. At its free end it is formed with a deflected portion 33 at an obtuse angle to its axis, which terminates in a latching part 34. The parts so far described constitute the animal trap proper and are of conventional design.

The novel parts of my invention consist of the eye bolt 37 threadably entered into the base 10, the eye ring being designated 35. The bait holder itself is made out of a single length of resilient wire, preferably hard steel wire so designed that it can be assembled on finished traps very readily. To this end I take a length of resilient wire and double it upon itself to provide oppositely arranged arms of equal length and a bight portion connecting them. The intermediate parts of the wire arms are bowed archedly in opposing directions so as to form a circular outline and constitute claw operating separate arms A and B, respectively. These arms A and B cross each other at H, and I to provide extension claw ends therebeyond. The outer ends of the arms are spear shaped or pointed as at L, as may be desired, and the claws are bowed apart in opposite directions as at J and K with respect to each other but bowed in the same direction individually when compared with the arms A and B nearest to them. Under normal resiliency of the handle arms A and B the pointed tip ends of the curved claws J and K touch at L, thereby requiring separation of the handles A and B by squeezing them together to separate the claws.

The bowed arms A and B converge together in close proximity at a point in longitudinal alignment with the claws J and K, at which points the bight portion of the doubled up strand of wire joins them by juncture loops E and F from which the inner converging ends of the circular loop G into which the bight portion has been shaped, extend. It will be noted that this bight portion G has been bent back over the bowed arms at an acute angle so as to project towards the center of the circular outline of the arms in the direction of the claws J and K.

In operation the device functions as follows: The ring eye of the eye bolt 37 extends longitudinally of the base on a medial line thereof. The looped bight portion G of the bait holder is loosely linked into the eye 35 of the eye bolt so as to have a universal bearing thereon to a certain extent. The latch end 34 of the gripping arm 30 is taken hold of, in setting the trap, depressed, against the tension of spring coils 25 and 26 which press with their fingers 27 and 28 upwardly on side arms 15 and 16 of the gripping device, causing the cross rod 17 of the latter to press upwardly against tripping arm 30 and hold its outermost latching end 34 in engagement with the looped portion G of the bait holder, as shown in Figures 1 and 2 especially. This interrelationship of the tripping bar 30 and bait holder disposes the loop G thereof vertically and the bait clamp is thereby caused to incline upwardly and forwardly of the loop G. In this position, the oppositely bowed arms A and B of the bait clamp can be readily grasped and squeezed together, so as to separate the claws J and K of the clamp, to allow the bait to be stuck onto the claws after which the claws are allowed to automatically close to retain the bait, under natural resiliency of the wire bait holder. The bait thus held, as at M, Figure 1, can readily be seized by the rodent attracted by its smell. Due to the circumstance that the clamp, composed of the bow-shaped arms A and B, can be readily manipulated on the eye bolt to which the bait holder is pivoted, the holder is assured free movement, in accordance with the movements described by the rodent holding the bait in his mouth, and can swing to the right, left, up or down or pulled straight back as the case may be, without having to be string-tied for that purpose.

I do not intend to confine myself to the exact details of construction herein disclosed save as indicated in the appended claims.

What I claim is:

1. A bait holder for attachment to a trap having a spring pressed clamp, a clamp tripping bar and an eye bolt, comprising a pair of opposed bait gripping jaws, a looped bight for holding the tripping bar in set position, and bowed handles connecting said jaws to the free ends of said bight and disposed at an acute angle relative to the plane of said loop, the free ends of said loop engageable in the edge of said eye bolt securing said attachment thereto in swivelling relation.

2. A bait holder for attachment to a trap having a spring pressed clamp, a tripping bar for said clamp and an eye bolt, adjacent the free end of said tripping bar comprising a looped bight for engagement with the free end of said tripping bar to hold said clamp in spring pressed set position, the free ends of said bight disposed in swivelling relation within the eye of said eye bolt, opposed outwardly bowed handle members on the free ends of said bight and disposed at an angle relative to the plane thereof, and opposed crossed bait gripping jaws on said handles remote from the ends of said bight.

3. A bait holder for attachment to a trap having a spring pressed clamp, a tripping bar for said clamp and an eye bolt adjacent the free end of said tripping bar comprising a looped bight for engagement with the free end of said tripping bar to hold said clamp in spring pressed set position, the free ends of said bight disposed in swivelling relation within the eye of said eye bolt, opposed outwardly bowed handle members on the free ends of said bight and disposed at an angle relative to the plane thereof, and opposed bait gripping jaws on said handles remote from the ends of said bight.

TREVELLIC O. MARTIN.

REFERENCES CITED

The following references are of record in the file of this patent:

UNITED STATES PATENTS

| Number | Name | Date |
| --- | --- | --- |
| 740,416 | Gebhardt | Oct. 6, 1903 |
| 1,025,362 | Benoy | May 7, 1912 |
| 1,434,505 | Schmidt | Nov. 7, 1922 |